United States Patent [19]

Lloyd et al.

[11] Patent Number: 5,191,274
[45] Date of Patent: Mar. 2, 1993

[54] METHOD AND APPARATUS FOR CONTROLLING THE SELF-DISCHARGE RATE OF A BATTERY

[75] Inventors: Robert D. Lloyd, Boca Raton, Fla.; David R. Dworkin, Lawrenceville, Ga.; Tuan Nguyen, Boca Raton, Fla.

[73] Assignee: Motorola, Inc., Schaumburg, Ill.

[21] Appl. No.: 728,828

[22] Filed: Jul. 9, 1991

Related U.S. Application Data

[63] Continuation of Ser. No. 426,913, Oct. 26, 1989, abandoned.

[51] Int. Cl.$^5$ .............. H02J 7/00; H01M 10/46; H01M 4/00; H01M 2/00
[52] U.S. Cl. .................................... 320/2; 320/13; 429/27; 429/164
[58] Field of Search .............. 429/1, 7, 27, 72, 101, 429/163, 164; 320/13, 15, 2

[56] References Cited

U.S. PATENT DOCUMENTS

| | | |
|---|---|---|
| 2,074,506 | 3/1937 | Heise . |
| 2,468,430 | 4/1949 | Derksen . |
| 2,632,032 | 3/1953 | Wincker . |
| 3,837,921 | 9/1974 | Henssen . |
| 3,963,519 | 6/1976 | Louie ............................ 429/164 X |
| 4,118,544 | 10/1978 | Przybyla et al. ........................ 429/27 |
| 4,189,526 | 2/1980 | Cretzmeyer et al. ............. 429/27 X |
| 4,262,062 | 4/1981 | Zatsky .............................. 429/72 X |
| 4,380,576 | 4/1983 | Yoshida et al. ....................... 429/27 |
| 4,493,880 | 1/1985 | Lund ................................. 429/27 X |
| 4,620,111 | 10/1986 | McArthur et al. ................ 429/27 X |
| 4,752,539 | 6/1988 | Vatter ................................... 429/1 |

Primary Examiner—R. J. Hickey
Attorney, Agent, or Firm—Thomas G. Berry; William E. Koch

[57] ABSTRACT

A sealing means is used for controlling the amount of one or more activating gases provided to an energy storage means so as to control the battery's self discharge rate.

12 Claims, 1 Drawing Sheet

METHOD AND APPARATUS FOR CONTROLLING THE SELF-DISCHARGE RATE OF A BATTERY

This is a continuation of application Ser. No. 07/426,913 filed on Oct. 26, 1989, now abandoned.

FIELD OF THE INVENTION

This invention relates in general to the field of energy sources, and more specifically, to a sealing arrangement for regulating the discharge rate and maximum current drain of a battery.

BACKGROUND OF THE INVENTION

Battery powered devices (e.g., pagers) have historically relied on batteries as their main power source. As these devices become smaller, the battery occupies an increasing amount of space relative to the remainder of the device's size. Therefore, it is desirable to reduce the size of the battery while maintaining at least the same energy capacity as contemporary batteries. Air-breathing (e.g., zinc-air) batteries meet these requirements, and therefore, are becoming more widely used in selective call receivers. As is known, proper zinc-air battery operation relies on air availability since the internal chemical reaction that occurs in a zinc-air battery results from the oxygen-zinc reaction.

Contemporary zinc-air battery construction incorporates the zinc into a casing having a number of holes to allow air to reach the zinc. These holes are initially sealed to prevent the zinc from prematurely reacting with the air (which reduces the battery's shelf life). Before using the battery to power a product, the seal(s) covering the air-holes are removed so as to allow the infiltration of air.

Generally, battery manufacturers attempt to produce batteries that will meet the broadest market demand. Therefore, it is common to manufacture batteries with a larger amount (or size) of holes than necessary to meet the needs of many applications. Regrettably, this practice tends to result in premature fuel exhaustion (commonly referred to as "self discharge"). That is, since the zinc-air reaction is dependent upon the amount of oxygen allowed to reach the zinc, the resulting continuous chemical reaction is often in excess of the requirements of the device due to the excessive number of holes, and therefore, the amount of air supplied. Thus, a need exists for a method to regulate an air-breathing battery in which the chemical reaction may be selectively controlled depending on the power requirements of the device being operated.

SUMMARY OF THE INVENTION

In carrying out the above, there is provided in one form of the invention a method of reducing the discharge rate of an energy storage means (e.g., a battery), while providing a desired current comprising a sealing means for controlling the amount of one or more activating gases provided to an energy storage means.

DETAILED DESCRIPTION OF THE INVENTION

Figure 1:
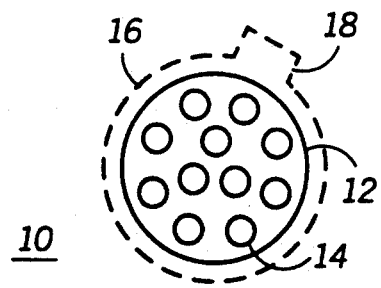
FIG. 1 is an illustration of a conventional zinc-air battery.

Referring to FIG. 1, a typical air-breathing battery 10 comprises a sealed (16) outer casing 12 having a plurality of supply holes 14 for facilitating the infiltration of one or more gases (e.g., air). Before using the battery 10 to power a product or device, the seal 16 is removed such as by pulling on an integral tab 18. This allows any surrounding atmospheric gases to contact an internal chemical substance via the now exposed supply holes 14. That is, the supply holes 14 allow oxygen and other gases to reach a chemical (e.g., zinc) thereby causing a chemical reaction, which generates electrical power. A number of chemicals and gases may be used without varying from the intent of the invention. As will be appreciated, if any over-supply of air reaches the chemical, a larger than necessary chemical reaction occurs, which reduces the operational lifetime of the battery. Thus, exposing all of the supply holes 14 to the atmosphere results in the battery 10 self-discharging at a more rapid rate than if the air supply holes 14 were only partially exposed. This results in the battery 10 discharging more rapidly than necessary even when not powering a device or product.

Figure 2A:
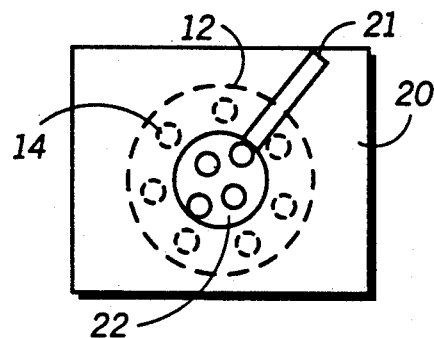
FIGS. 2A and 2B are illustrations of a seal in accordance with the present invention.
Figure 2B:
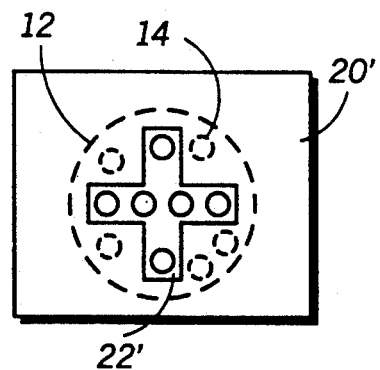

Referring to FIG. 2A and 2B, the present invention can be seen to employ a sealing means 20 (and 20') to regulate the amount of surrounding atmospheric gases that may contact the battery's internal chemical(s). That is, the holes 14' of the zinc-air battery may be selectively exposed to limit self-discharge and the battery's maximum current drain. The number and size of the holes 14' in zinc-air batteries determines the maximum current capability of the battery and the rate at which the battery will self-discharge. Therefore, sealing (or blocking) a pre-determined number of holes 14 with a sealing means 20, allows the battery to more clearly match the requirements of the device in which it is used (e.g., a selective call receiver). In the preferred embodiment, the method of sealing the air supply holes 14' is accomplished by placing the battery against a compliant seal 20 having an opening 22. The seal is preferably constructed of a low durometer (i.e., durometer 10–50) silicon rubber material or its equivalent. The opening 22 may vary in size and shape (e.g., 22') to expose any number of supply holes 14 without varying from the intent of the invention. Moreover, should a device's power requirements change, a seal having another opening shape may be readily installed to optimize the operational performance of the battery. In this way, the battery's current capability and self-discharge rate are controlled.

Figure 3:
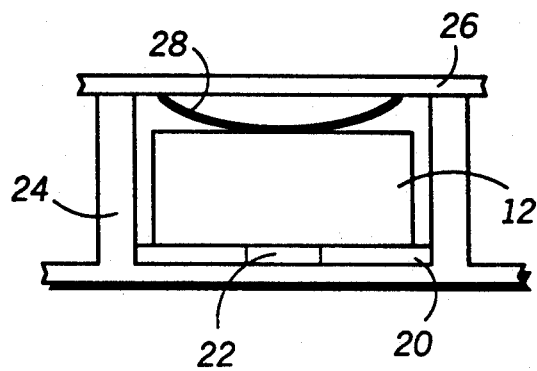
FIG. 3 is a cross sectional illustration of the preferred battery installation in accordance with the present invention.

Referring to FIG. 3, the battery is illustrated installed in a device having a battery compartment formed within a housing 24. As is shown, the seal 20 is positioned within the battery compartment to control the amount of activating gases that may reach the battery via the seal opening 22. Air is supplied to the opening 22 by an air passage 21, integral to the seal 20. In the preferred embodiment of the present invention, the battery compartment is enclosed by a battery door (or equivalent) 26, which provides an effective amount of pressure or force so as to ensure that the seal 20 appropriately blocks certain supply holes. Alternately, a pressure or tension means (for example a spring) 28 may be used to ensure proper contact between the battery and the seal 20. In the preferred embodiment, a spring is used to provide the necessary force, while also providing an electrical contact to the battery as is known in the art. Thus, the present invention is able to expose the least amount of atmospheric gases (via the supply holes) as it necessary for any particular implementation, while maintaining a sufficient amount of power so as to operate a designated device.

What is claimed is:

1. A reduced self-discharge energy storage device, comprising:

energy storage means, housed in a casing, for providing energy in response to exposure to an effective amount of at least one activating gas entering through a plurality of supply holes;

interchangeable sealing means having a durometer in a range of durometer ten to fifty being positioned contiguous to said casing on an outer surface for selectively sealing at least one of said plurality of supply holes so as to control or regulate at least one activating gas to contact the energy storage means; and tension means for maintaining an effective amount of force between said energy storage means and said interchangeable sealing means.

2. The energy storage device of claim 1, which includes tension means for maintaining an effective amount of force between the energy storage means and the sealing means.

3. The energy storing device according to claim 1 wherein said energy storing device comprises an air-breathing battery.

4. The energy storing device according to claim 3 wherein said air-breathing battery comprises a zinc-air battery.

5. The energy storing device according to claim 1 wherein said interchangeable sealing means selectively regulates or controls air flow to said at least one supply hole.

6. The energy storage device of claim 5, wherein the low durometer material comprises silicon rubber.

7. A method of reducing the discharge rate of a battery while providing a desired current comprising the steps of:

(a) placing an energy storage device into a housing having an interchangeable sealing means disposed therein so as to regulate exposure of at least one activating gas entering through a plurality of supply holes to the energy storage device;

(b) interchangeably sealing at least one of said plurality of supply holes with an interchangeable sealing means having a durometer in a range of durometer ten to fifty being positioned contiguous at an outer surface of said housing so as to control or regulate said at least one activating gas to contact the energy storage device; and (c) enclosing said energy storage device within said housing while applying an effective force to facilitate contact between said energy storage device and said interchangeable sealing means.

8. The method of claim 7, which includes the step of (c) enclosing the energy storage device within the housing.

9. The method of claim 7, wherein step (c) comprises the step of enclosing the energy storage device within the housing while applying an effective force to facilitate contact between the energy storage device and the sealing means.

10. A reduced self-discharge energy storage device, comprising:

energy storage means, housed in a casing, for providing energy in response to exposure to an effective amount of at least one activating gas entering through a plurality of supply holes;

interchangeable silicon rubber sealing means having a durometer in a range of durometer ten to fifty, and being positioned contiguous to an outer surface of said casing for selectively sealing at least one of said plurality of supply holes so as to control or regulate at least one activating gas to contact the energy storage means; and tension means for maintaining an effective amount of force between said energy storage means and said interchangeable silicon rubber sealing means.

11. A zinc-air battery, comprising:

energy storage means, housed in a casing, for providing energy in response to exposure to an effective amount of air entering through a plurality of supply holes;

interchangeable silicon rubber sealing means having a durometer in a range of durometer ten to fifty, and being positioned contiguous to an outer surface of said casing for selectively sealing at least one of said plurality of supply holes so as to control or regulate the amount of air permitted to contact the energy storage means; and tension means for maintaining an effective amount of force between said energy storage means and said interchangeable silicon rubber sealing means.

12. A method of reducing the discharge rate of a battery while providing a desired current comprising the steps of:

(a) placing an energy storage device into a housing having an interchangeable silicon rubber sealing means having a durometer in a range of durometer ten to fifty disposed therein so as to regulate exposure of at least one activating gas entering through a plurality of supply holes to the energy storage device;

(b) interchangeably sealing at least one of said plurality of supply holes at an outer surface of said housing so as to control or regulate said at least one activating gas to contact the energy storage device; and (c) enclosing said energy storage device within said housing while applying an effective force to facilitate contact between said energy storage device and said interchangeable silicon rubber sealing means.

* * * * *